(12) United States Patent
Zhang et al.

(10) Patent No.: US 11,936,235 B2
(45) Date of Patent: Mar. 19, 2024

(54) METHOD AND APPARATUS OF POWER DISTRIBUTION CONTROL FOR POWER MODULE AND POWER MODULE DEVICE

(71) Applicant: CONTEMPORARY AMPEREX TECHNOLOGY CO., LIMITED, Ningde (CN)

(72) Inventors: Huaisen Zhang, Ningde (CN); Yuan Yao, Ningde (CN); Meng Li, Ningde (CN); Weichen He, Ningde (CN); Guiying Lin, Ningde (CN); Yu Yan, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/903,853

(22) Filed: Sep. 6, 2022

(65) Prior Publication Data
US 2023/0208181 A1    Jun. 29, 2023

Related U.S. Application Data

(63) Continuation of application No. PCT/CN2022/093030, filed on May 16, 2022.

(30) Foreign Application Priority Data

Dec. 27, 2021  (CN) .......................... 202111610539.5

(51) Int. Cl.
  *H02J 7/00*  (2006.01)
(52) U.S. Cl.
  CPC .... *H02J 7/007194* (2020.01); *H02J 7/00032* (2020.01); *H02J 7/0013* (2013.01); *H02J 7/00309* (2020.01)

(58) Field of Classification Search
  CPC .... H02J 7/00; H02J 7/007194; H02J 7/00032; H02J 7/00309; H02J 7/0013
  See application file for complete search history.

(56) References Cited

U.S. PATENT DOCUMENTS

| | | |
|---|---|---|
| 2009/0230772 A1 | 9/2009 | Caudill |
| 2015/0207400 A1 | 7/2015 | Shenoy et al. |
| 2021/0034129 A1 | 2/2021 | Mitova et al. |

FOREIGN PATENT DOCUMENTS

| | | |
|---|---|---|
| CN | 106484004 A | 3/2017 |
| CN | 108063427 A | 5/2018 |

(Continued)

OTHER PUBLICATIONS

The World Intellectual Property Organization (WIPO) International Search Report for PCT/CN2022/093030 dated Sep. 20, 2022 7 pages (including English translation).

(Continued)

*Primary Examiner* — Robert L Deberadinis
(74) *Attorney, Agent, or Firm* — ANOVA LAW GROUP, PLLC

(57) ABSTRACT

The present application relates to a method and apparatus of power distribution control for power module and a power module device. The method includes: obtaining temperature data of target devices in two or more power modules; analyzing whether the power modules are operating at full power when the temperature data of the target devices meets a preset temperature fault condition; and adjusting operating parameters of the power modules based on the temperature data when the power modules are not operating at full power.

10 Claims, 4 Drawing Sheets

(56) References Cited

FOREIGN PATENT DOCUMENTS

| | | | |
|---|---|---|---|
| CN | 108780349 A | 11/2018 |
| CN | 110875710 A | 3/2020 |
| CN | 111638666 A | 9/2020 |
| CN | 112114599 A | 12/2020 |
| CN | 112583248 A | 3/2021 |
| CN | 113541599 A | 10/2021 |
| CN | 113691150 A | 11/2021 |
| EP | 3890178 A1 | 10/2021 |
| WO | 2021038246 A1 | 3/2021 |

OTHER PUBLICATIONS

The China National Intellectual Property Administration (CNIPA) The First Office Action for Chinese Application 202111610539.5 dated Jun. 17, 2023 9 Pages (including English translation).

The China National Intellectual Property Administration (CNIPA) Notice of Grant of Invention Patent Right for Application No. 20211610539.5 dated Sep. 14, 2023 14 Pages(including translation).

The European Patent Office (EPO) The Extended European Search Report for 22757195.7 dated Oct. 27, 2023 8 Pages.

METHOD AND APPARATUS OF POWER DISTRIBUTION CONTROL FOR POWER MODULE AND POWER MODULE DEVICE

CROSS REFERENCE TO RELATED APPLICATION

This application is a continuation application of PCT Patent Application No. PCT/CN2022/093030, entitled "METHOD AND APPARATUS OF POWER DISTRIBUTION CONTROL FOR POWER MODULE AND POWER MODULE DEVICE" filed on May 16, 2022, which claims priority to Chinese Patent Application No. 202111610539.5, filed with the State Intellectual Property Office of the People's Republic of China on Dec. 27, 2021, and entitled "METHOD AND APPARATUS OF POWER DISTRIBUTION CONTROL FOR POWER MODULE AND POWER MODULE DEVICE", all of which are incorporated herein by reference in their entirety.

TECHNICAL FIELD

The present application relates to a technical field of electrical device, in particular to a method and apparatus of power distribution control for power module and power module device.

BACKGROUND

In power modules in which multiple units are cascaded, the heat generated by individual units will be inconsistent due to the inconsistent among internal devices. In this case, even when the units are operating under the same operating condition, the heat generated by one unit is different from the heat generated by another unit, and the aging degrees of individual units will also be inconsistent. If a device of a unit is operated beyond a limit temperature for a long time, an irreversible damage may be caused to the device earlier than expected, which will affect the normal use of the module. How to distribute power according to the actual situation to prolong the service life of the power module is a problem to be solved urgently.

SUMMARY

A method of power distribution control for a power module, including:
obtaining temperature data of target devices in two or more power modules;
analyzing whether the power modules are operating at full power when the temperature data of the target devices meets a preset temperature fault condition; and
adjusting operating parameters of the power modules based on the temperature data when the power modules are not operating at full power.

In the embodiment of the present application, by adjusting the operating parameters of the power modules based on the temperature data of the target devices in the power modules, the distribution of power according to the actual requirement is realized, and inconsistent aging among the individual power modules due to significant difference on the generated heat among the individual power modules is avoided, and thus the service lives of the power modules are prolonged.

In one embodiment, the temperature fault condition includes that a temperature of a target device is greater than a preset temperature threshold, or the temperature fault condition includes that a temperature change rate of a target device is greater than a preset temperature change threshold.

In one embodiment, the target devices include a semiconductor device and/or a magnetic device.

In one of the embodiments, after analyzing whether the power modules are operating at full power when the temperature data of the target devices meets the preset temperature fault condition, the method further includes: when the power modules are operating at full power, controlling the power modules operating at full power to operate at reduced power.

In one embodiment, adjusting the operating parameters of the power modules based on the temperature data when the power modules are not operating at full power includes: when the power modules are not operating at full power and each of the power modules is at over-temperature, controlling each of the power modules to operate at reduced power; and when the power modules are not operating at full power and a portion of the power modules are at over-temperature, adjusting the operating parameters of the power modules based on a connection relationship among the power modules.

In the embodiment of the present application, when there is still a temperature fault, a power-up or power-down processing may be performed on the power modules according to the actual situation, so as to solve the temperature fault of the power modules and ensure the overall output power to external.

In one of the embodiments, the operating parameters of the power modules include current and voltage; and adjusting the operating parameters of the power modules based on the connection relationship among the power modules includes: when the power modules are in a series connected state, maintaining the current of the power modules unchanged, reducing voltages of power modules which are at over-temperature, and increasing voltages of power modules which are not at over-temperature, to maintain an output power of the power modules to external unchanged; and when the power modules are in a parallel connected state, maintaining the voltage of the power modules unchanged, reducing currents of power modules which are at over-temperature, and increasing currents of power modules which are not at over-temperature, to maintain an output power of the power modules to external unchanged.

In the embodiment of the application, by correspondingly adjusting the voltages or currents of the power modules considering the actual connection relationship among the power modules, the temperature fault of the power modules which are at over-temperature is eliminated while the overall output power of all the power modules to external is maintained unchanged, a more reasonable power distribution is realized and the consistency among the devices is ensured, and the service lives of the power modules are further prolonged.

An apparatus of power distribution control for power module, including:
a data obtaining module configured to obtain temperature data of target devices in two or more power modules;
a data analysis module configured to analyze whether the power modules are operating at full power when the temperature data of the target devices meets a preset temperature fault condition; and
a parameter adjustment module configured to adjust operating parameters of the power modules based on the temperature data when the power modules are not operating at full power.

In the embodiment of the present application, by adjusting the operating parameters of the power modules based on the temperature data of the target devices in the power modules, the distribution of power according to the actual requirement is realized, and inconsistent aging among the individual power modules due to significant difference on the generated heat among the individual power modules is avoided, and thus the service lives of the power modules are prolonged.

A power module device including temperature acquisition devices, a control device, and two or more power modules, wherein the temperature acquisition devices are arranged on target devices of the power modules, and the control device is connected to the temperature acquisition devices and the power modules, wherein the temperature acquisition devices are configured to acquire temperature data of the target devices in the power modules and send the temperature data to the control device, and the control device is configured to perform a power distribution control according to the above method.

In one embodiment, the temperature acquisition devices are negative temperature coefficient (NTC) resistors.

In one embodiment, the power modules are connected in series or in parallel.

BRIEF DESCRIPTION OF THE DRAWINGS

In order to explain the technical solutions of the embodiments of the present application more clearly, the figures which need to be used in the embodiments of the present application will be briefly described below. Obviously, the figures described below only involve some embodiments of the present application. For those ordinary skilled in the art, other figures may also be obtained from the figures without the exercise of inventive faculty.

DETAILED DESCRIPTION

Figure 1:
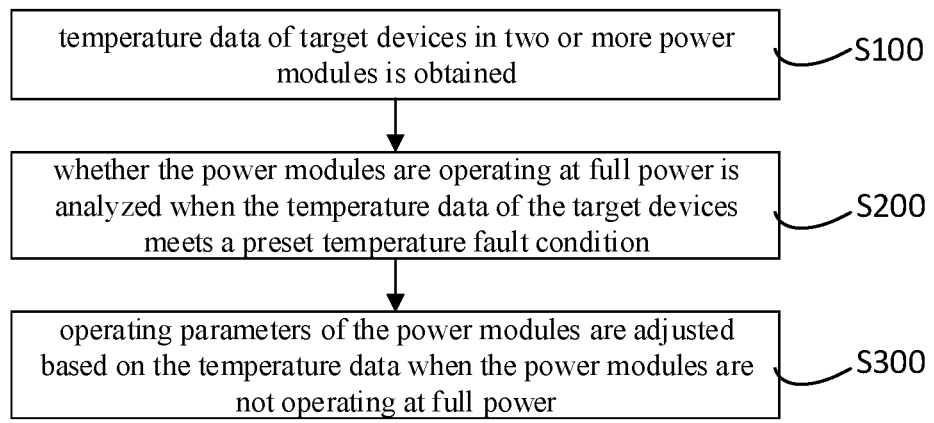
FIG. 1 is a flowchart of a method of power distribution control for power module in an embodiment.

In order to make the purpose, technical solutions and advantages of the application clearer, the application will be described in further detail below in connection with the figures and embodiments. It should be understood that the specific embodiments described herein are only used for explaining the present application, but not for limiting the present application.

Unless otherwise defined, all technical and scientific terms used herein have the same meaning as commonly understood by those ordinary skilled in the art to which this application belongs. The terms used herein in the description of the application are for the purpose of describing specific embodiments only, and are not intended to limit the application.

It should be noted that when an element is referred to as being "connected" to another element, it may be directly connected to the another element or connected to the another element through intervening elements. The "connection" in the following embodiments should be understood as "electrical connection", "communication connection" or the like if the connected circuits, modules, units and so on have electrical signals or data transmission among them.

As used herein, the singular forms "a", "an", and "the/the" may include the plural forms as well, unless the context clearly dictates otherwise. It should also be understood that the terms "comprise/include" or "have" or the like designate the presence of stated features, integers, steps, operations, components, parts or combinations thereof, but do not preclude the possibilities of presence or addition of one or more other features, integers, steps, operations, components, parts or combinations thereof. Meanwhile, terms used in this description include any and all combinations of the associated listed items.

In power modules in which multiple units are cascaded, the heat generated by individual units will be inconsistent due to the inconsistent among semiconductor devices and magnetic devices. In this case, even when the units are operating under the same operating condition, the heat generated by one unit is different from the heat generated by another unit, and the aging degrees of individual units will also be inconsistent. For the above reasons, if a device of a unit is operated beyond a limit temperature for a long time, an irreversible damage may be caused to the device earlier than expected, which will affect the normal use of the module.

Based on the above, the application provides a temperature-based power distribution strategy. When the system senses that power modules are at over-temperature or temperature change rates exceed a certain value through NTCs on a power device, it will change the currents, voltages, powers or the like of corresponding units based on the positions of the NTCs, to reduce the heat generated by the units and the temperature change rates of the units. By distributing the load capacities of two modules through this strategy, the power may be distributed more reasonably according to the real-time environment, the service lives of the power modules can be greatly prolonged and the disadvantages caused by device inconsistency can be reduced.

In some embodiments, a method of power distribution control for power module is provided, in which the power module is applicable to an electric electrical device such as a charging piles or the like device. As shown in FIG. 1, the method includes the following steps.

At step S100, temperature data of target devices in two or more power modules is obtained.

In some embodiments, the number of power modules may be two or more, and the power modules may be connected in series or in parallel. Temperature acquisition devices may be arranged at the target devices of the power modules, to acquire temperature data of the target devices and send the temperature data to a control device. The number of target devices may be one or more. The type of individual target device is not unique, and may be selected according to actual requirement. In some embodiments, the target devices include a semiconductor device and/or a magnetic device. For example, in particular, a power tube heat sink, an inductor, a transformer or the like in a power module may be set as a target device to be temperature monitored. The type of individual temperature acquisition device is not unique, and in particular, a NTC resistor may be used as a temperature acquisition device. The type of the control device is not unique, and a device such as a DSP (Digital Signal Processing) processor, an MCU (Micro Control Unit), a CPU (Central Processing Unit) or the like may be used as the control device.

At step S200, whether the power modules are operating at full power is analyzed when the temperature data of the target devices meets a preset temperature fault condition.

After receiving the temperature data of the target devices, the control device compares and analyzes the temperature data with the preset temperature fault condition, and when the temperature data of the target devices meets the preset temperature fault condition, it may be considered that a temperature fault occurs in the corresponding power modules, and then whether the current power modules are operating at full power is analyzed based on a saved maximum power threshold. If the current power modules are not operating at full power, step S300 may be performed.

The specific content of the temperature fault condition is not unique. In some embodiments, the temperature fault condition includes that a temperature of a target device is greater than a preset temperature threshold, or the temperature fault condition includes that a temperature change rate of a target device is greater than a preset temperature change threshold. Taking a power module including multiple target devices as an example, the control device may determine that the temperature fault is occurred in the power module when it is detected that there is a target device of which a temperature is higher than a temperature threshold, in the power module, or there is a target device of which a temperature change rate is higher than a temperature change threshold.

At step S300, operating parameters of the power modules are adjusted based on the temperature data when the power modules are not operating at full power.

When the control device determines that the power modules are not operating at full power, and a power-up adjustment operation or power-down adjustment operation may be performed according to actual requirement, the control device may adjust the operating parameters of the power modules based on the temperature data actually acquired. The working parameters may be the voltage and/or current of the power modules. In some embodiments, the control device may control output powers of power modules with the temperature fault to be decreased, while control output powers of power modules without the temperature fault to be increased, so as to solve the problem of the temperature fault of the power modules, while eliminate or reduce the impact of a change on overall output power of the power modules to the external.

In the method of power distribution control for power module, the temperature data of target devices in two or more power modules is obtained, whether the power modules are operating at full power is analyzed when the temperature data of the target devices meets a preset temperature fault condition, and the operating parameters of the power modules are adjusted based on the temperature data if the power modules are not operating at full power. By adjusting the operating parameters of the power modules based on the temperature data of the target devices in the power modules, the distribution of power according to the actual requirement is realized, and inconsistent aging among the individual power modules due to significant difference on the generated heat among the individual power modules is avoided, and thus the service lives of the power modules are prolonged.

Further, in some embodiments, after step S200, the method further includes: when the power modules are operating at full power, the power modules operating at full power is controlled to operate at reduced power, and then the method returns to step S100. The power modules operating at full power may include power modules with the temperature fault or power modules without the temperature fault. In some embodiments, when there is a power module with the temperature fault, and the control device detects that the power module is operating at full power, the control device controls the power module operating at full power to reduce its output power, specifically by reducing the voltage or current to reduce the output power of the power module operating at full power. Then the temperature data of the target device(s) in the power module is detected again to determine whether the temperature fault still exists. When there still is the temperature fault, a power-up or power-down processing may be performed on the power modules according to the actual situation, so as to solve the temperature fault of the power modules while ensure the overall output power to external.

In some embodiments, step S300 includes: when the power modules are not operating at full power and each of the power modules is at over-temperature, each of the power modules is controlled to operate at reduced power; and when the power modules are not operating at full power and a portion of the power modules are at over-temperature, the operating parameters of the power modules are adjusted based on a connection relationship among the power modules.

When the power modules are not operating at full power, the control device first analyzes whether all the power modules are at over-temperature, and the over-temperature occurring in a power modules means that there is a target device of which the temperature is greater than the temperature threshold or the temperature change rate is greater than the temperature change threshold. If all power modules are overheated, the control device controls all power modules to operate at reduced power. If only a portion of the power modules are overheated, the control device correspondingly adjusts the operating parameters of the power modules based on the actual connection relationship among the individual power modules.

Further, in some embodiments, the operating parameters of the power modules include current and voltage; in step S300, adjusting the operating parameters of the power modules based on the connection relationship among the power modules includes: when the power modules are in a series connected state, maintaining the current of the power modules unchanged, reducing voltages of power modules which are at over-temperature, and increasing voltages of power modules which are not at over-temperature, to maintain an output power of the power modules to external unchanged; and when the power modules are in a parallel connected state, maintaining the voltage of the power modules unchanged, reducing currents of power modules which are at over-temperature, and increasing currents of power modules which are not at over-temperature, to maintain an output power of the power modules to external unchanged.

In the embodiment of the application, by correspondingly adjusting the voltages or currents of the power modules considering the actual connection relationship among the power modules, the temperature fault of the power modules which are at over-temperature is eliminated while the overall output power of all the power modules to external is maintained unchanged, a more reasonable power distribution is realized and the consistency among the devices is ensured, and the service lives of the power modules are further prolonged.

It should be understood that, although the steps in the flowcharts involved in the above embodiments are sequentially illustrated according to the arrows, these steps are not necessarily performed in the order indicated by the arrows.

Unless explicitly stated herein, the performing of these steps is not strictly limited to the order, and these steps may be performed in other orders. Further, at least a portion of the steps in the flowcharts involved in the above embodiments may include multiple steps or multiple stages, and these steps or stages are not necessarily performed and completed synchronously, but may be performed at different times. The performing order of these steps or phases is not necessarily sequential, but they may be performed in turn or alternately with other steps or at least a portion of the steps or phases in the other steps.

Based on the same inventive concept, an embodiment of the present application further provides an apparatus of power distribution control for power module for implementing the above-mentioned method of power distribution control for power module. The solution to the problem provided by the apparatus is similar to the solution described in the above method, so the specific definitions in the embodiments of the apparatus of power distribution control for one or more power module provided below may refer to the above definitions for method of power distribution control for power module, which will not be repeated here.

Figure 2:
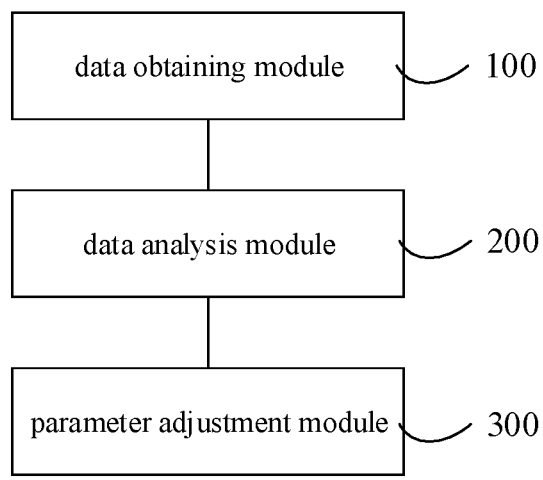
FIG. 2 is a structural block diagram of an apparatus of power distribution control for power module in an embodiment.

In some embodiments, an apparatus of power distribution control for power module is further provided, in which the power module is applicable to an electric electrical device such as a charging piles or the like device. As shown in FIG. 2, the apparatus includes a data obtaining module 100, a data analysis module 200 and a parameter adjustment module 300.

The data obtaining module 100 is configured to obtain temperature data of target devices in two or more power modules.

The data analysis module 200 is configured to analyze whether the power modules are operating at full power when the temperature data of the target devices meets a preset temperature fault condition.

The parameter adjustment module 300 is configured to adjust operating parameters of the power modules based on the temperature data when the power modules are not operating at full power.

In some embodiments, the temperature fault condition includes that a temperature of a target device is greater than a preset temperature threshold, or the temperature fault condition includes that a temperature change rate of a target device is greater than a preset temperature change threshold.

In some embodiments, the data analysis module 200 is further configured to, when the power modules are operating at full power, control the power modules operating at full power to operate at reduced power, and the data obtaining module 100 is then controlled to obtain the temperature data of the target devices in the two or more power modules again.

In some embodiments, the parameter adjustment module 300 is configured to: when the power modules are not operating at full power and each of the power modules is at over-temperature, control each of the power modules to operate at reduced power; and when the power modules are not operating at full power and a portion of the power modules are at over-temperature, adjust the operating parameters of the power modules based on a connection relationship among the power modules.

In some embodiments, the parameter adjustment module 300 is configured to: when the power modules are in a series connected state, maintain the current of the power modules unchanged, reduce voltages of power modules which are at over-temperature, and increase voltages of power modules which are not at over-temperature, to maintain an output power of the power modules to external unchanged; and when the power modules are in a parallel connected state, maintain the voltage of the power modules unchanged, reduce currents of power modules which are at over-temperature, and increase currents of power modules which are not at over-temperature, to maintain an output power of the power modules to external unchanged.

Each module in the apparatus of power distribution control for power module may be implemented in whole or in part by software, hardware, and combination thereof. The above modules may be embedded in or independent of a processor in a computer device in a form of hardware, or stored in a memory in the computer device in a form of software, so that the processor may call and execute operations corresponding to the above modules.

In some embodiments, a power module device is further provided, the power module device includes temperature acquisition devices, a control device, and two or more power modules, wherein the temperature acquisition devices are arranged on target devices of the power modules, and the control device is connected to the temperature acquisition devices and the power modules, wherein the temperature acquisition devices are configured to acquire temperature data of the target devices in the power modules and send the temperature data to the control device, and the control device is configured to perform a power distribution control according to the above method.

The number of power modules may be two or more, and the power modules may be connected in series or in parallel. The number of target devices may be one or more. The type of individual target device is not unique, and may be selected according to actual requirement. In some embodiments, the target devices include a semiconductor device and/or a magnetic device. For example, in particular, a power tube heat sink, an inductor, a transformer or the like in a power module may be set as a target device to be temperature monitored. The type of individual temperature acquisition device is not unique, and in particular, a NTC resistor may be used as a temperature acquisition device. The type of the control device is not unique, and a device such as a DSP processor, an MCU, a CPU or the like may be used as the control device.

In some embodiments, the temperature fault condition includes that a temperature of a target device is greater than a preset temperature threshold, or the temperature fault condition includes that a temperature change rate of a target device is greater than a preset temperature change threshold.

In some embodiments, the control device is further configured to, when the power modules are operating at full power, control the power modules operating at full power to operate at reduced power. In this case, the temperature acquisition devices acquire the temperature data of the target devices in the two or more power modules again.

In some embodiments, the control device is configured to, when the power modules are not operating at full power and each of the power modules is at over-temperature, control each of the power modules to operate at reduced power; and when the power modules are not operating at full power and a portion of the power modules are at over-temperature, adjust the operating parameters of the power modules based on a connection relationship among the power modules.

In some embodiments, the control device is configured to, when the power modules are in a series connected state, maintain the current of the power modules unchanged, reduce voltages of power modules which are at over-temperature, and increase voltages of power modules which are not at over-temperature, to maintain an output power of the power modules to external unchanged; and when the power modules are in a parallel connected state, maintain the voltage of the power modules unchanged, reduce currents of power modules which are at over-temperature, and increase currents of power modules which are not at over-temperature, to maintain an output power of the power modules to external unchanged.

In order to better understand the above-mentioned method, apparatus of power distribution control for power module and the power module device, the following detailed explanations are given in conjunction with specific embodiments.

In multiple cascaded power modules, the heat generated by individual power modules will be inconsistent due to the inconsistent of the semiconductor devices and the magnetic devices. In this case, even when the individual power modules are operating under the same operating condition, the heat generated by one power module is different from the heat generated by another power module, and the aging degrees of individual devices will also be inconsistent. For the above reasons, if a device of a power module is operated beyond a limit temperature for a long time, an irreversible damage may be caused to the device earlier than expected, which will affect the normal use of the module.

Based on the above, the present application provides a strategy for adjusting the operating states of two power modules based on the module temperatures, which is suitable for power distribution for power modules in an electric electrical device such as a charging piles or the like device. A plurality of NTC resistors are placed on the heat-generating semiconductor devices and magnetic devices respectively, and the powers, currents, voltages or the like of the two power modules will be determined based on the temperatures and temperature change rates of the NTC resistors.

In some embodiments, when it is sensed that power modules are at over-temperature or temperature change rates exceed a certain value through NTC resistors on a power device, the currents, voltages, powers or the like of corresponding power modules will be changed based on the positions of the NTC resistors, to reduce the heat generated by the modules and the temperature change rates of the modules. By distributing the load capacities of two modules through this strategy, the power may be distributed more reasonably according to the real-time environment, the service lives of the power modules can be greatly prolonged and the disadvantages caused by device inconsistency can be reduced. In addition, this strategy is not limited to two power modules, but may be extended to N power modules, to determine the power distribution of the individual modules based on the temperatures and the temperature change rates of the N power modules. This strategy is particular useful in a scenario of high-power modules.

Figure 3:
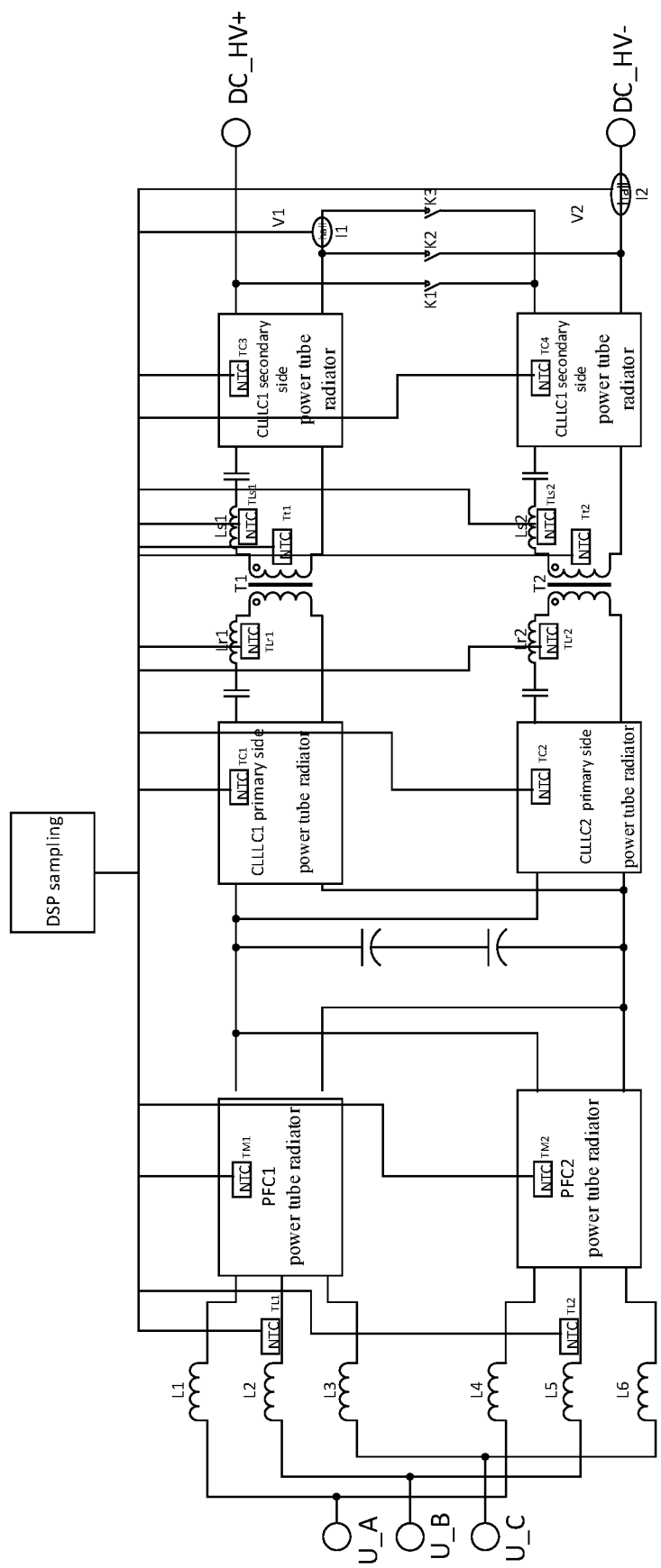
FIG. 3 is a schematic diagram of temperature sampling for power modules in an embodiment.

As shown in FIG. 3, in this scheme, NTC resistors are arranged on the sampling positions of main heat-generating devices such as semiconductor devices and magnetic devices, and by sampling to DSP processor via these NTC resistors, the temperatures and temperature change rates of individual heat-generating devices may be obtained, which provides the necessary hardware guarantee for the performing of our strategy. The target devices of the power modules include power tube radiators, inductors and transformers, K1 and K2 which are parallel relays, and K3 which is a series relay.

Figure 4:
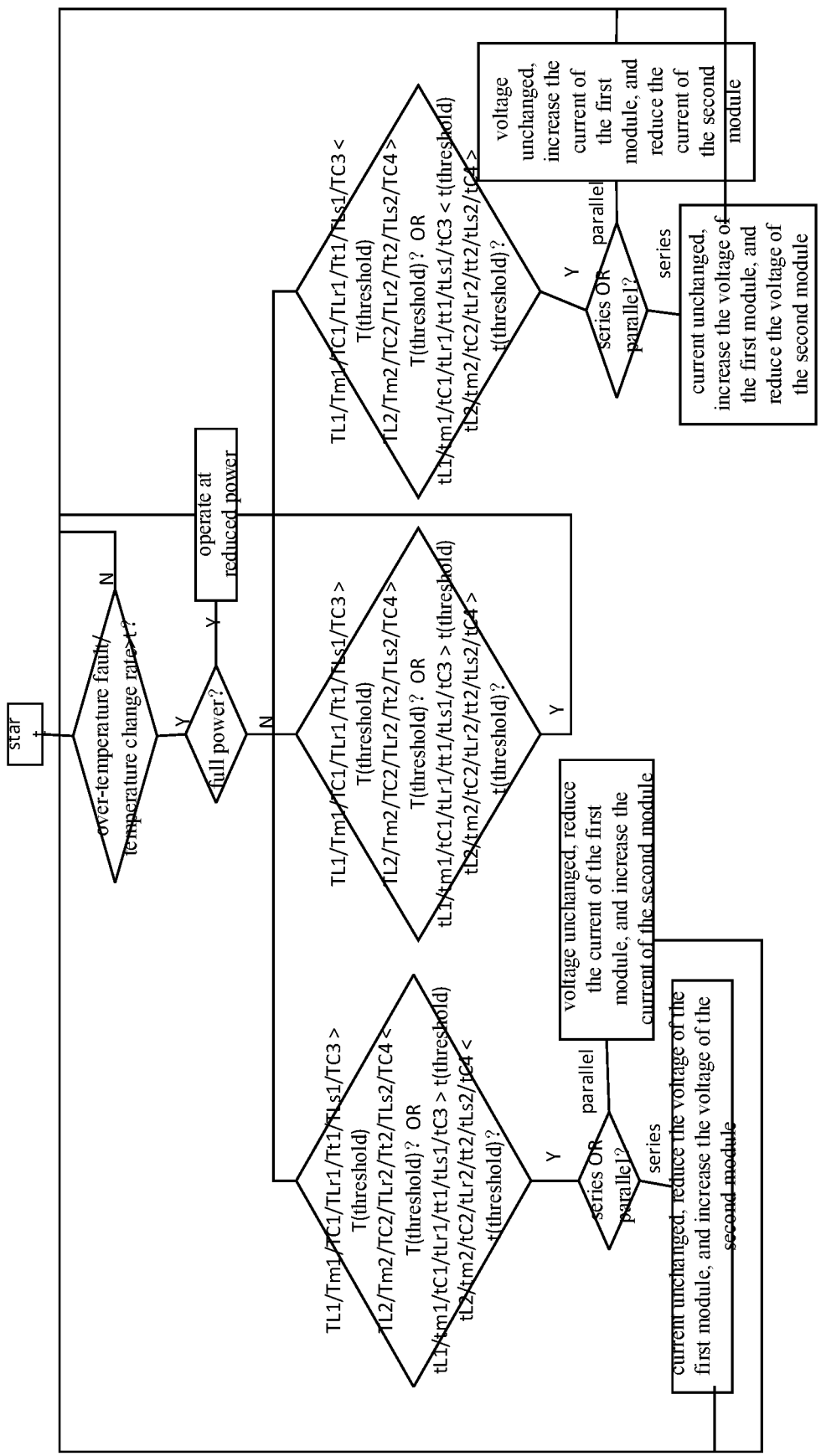
FIG. 4 is a schematic flowchart of power distribution control for power module in an embodiment.

The strategy provided by the scheme is shown in FIG. 4, taking two power modules as an example, the temperature data acquired from one power module includes data $TL1$, $Tm1$, $TC1$, $TLr1$, $Tt1$, $TLs1$ and $TC3$, the temperature change rates obtained based this temperature data includes change rates $tL1$, $tm1$, $tC1$, $tLr1$, $tt1$, $tLs1$ and $tC3$; the temperature data acquired from another power module includes data $TL2$, $Tm2$, $TC2$, $TLr2$, $Tt2$, $TLs2$ and $TC4$, the temperature change rates obtained based this temperature data includes change rates $tL2$, $tm2$, $tC2$, $tLr2$, $tt2$, $tLs2$, and $tC4$. A power module may be determined as having a temperature fault, if any temperature data of the power module is greater than the temperature threshold or any of the temperature change rates of the power module is greater than the change rate threshold. Depending on the different determining ways, the temperature fault may be classified as two situations, which are at over-temperature and a too-fast temperature change rate. When the over-temperature fault (that is, the temperature is greater than a temperature threshold T) or the too-fast temperature change rate (that is, the temperature change rate is greater than a change rate threshold t) occurs in the power modules, whether the power modules are operating at full power is determined first. When the power modules are operating at full power, the power modules are to be operated at reduced power, and then whether the over-temperature fault or the too-fast temperature change rate still exists is determined again.

When the power modules are not operating at full power, and when it is detected that the first module and the second module are at over-temperature at the same time, the first module and the second module are to be operated at reduced power. When it is detected that the first module is at over-temperature and the second module is not over-temperature, whether the modules are in a series connected state or a parallel connected state is determined. When the series connected state is determined, the current of the two modules are maintained unchanged, the voltage of the power module which is at over-temperature is reduced, and the voltage of the power module which is not over-temperature is increased, to maintain the overall output power of the modules to external unchanged. When the parallel connected state is determined, the voltage of the two modules are maintained unchanged, the current of the power module which is at over-temperature is reduced, and the current of the power module which is not over-temperature is increased. It could be understood that when it is detected that the second module is at over-temperature and the first module is not over-temperature, whether the modules are in a series connected state or a parallel connected state is also analyzed. When the series connected state is determined, the current of the two modules are maintained unchanged, the voltage of the power module which is at over-temperature is reduced, and the voltage of the power module which is not over-temperature is increased, to maintain the overall output power of the modules to the external unchanged. When the parallel connected state is determined, the voltage of the two modules are maintained unchanged, the current of the power module which is at over-temperature is reduced, and the current of the power module which is not over-temperature is increased. By adjusting the operating parameters of the power modules based on the temperature data of the target devices in the power modules, the distribution of power according to the actual requirement is realized, the significant difference on the generated heat among the individual power modules is avoided, and finally it is ensured that each heat-generating device is controlled within the ideal working temperature, which not only ensures the normal output of power, but also ensures the lives of the devices and prolongs the lives of the modules.

The various technical features of the above-described embodiments may be combined arbitrarily. In order to make the description simple, not all of the possible combinations of the various technical features in the above-described embodiments are described. However, all of the combinations of these technical features should be regarded as within the scope of the description, as long as there is not a conflict among them.

The above-described embodiments only express several embodiments of the application, and the description of them is specific and detailed, but the description should not be construed as a limitation to the scope of the present application. It should be noted that, for those ordinary skilled in the art, modifications and improvements may be further made without departing from the concept of the present application, which all within the protection scope of the present application. Therefore, the protection scope of the present application shall be subject to the appended claims.

What is claimed is:

1. A method of power distribution control for a power module, comprising:
   obtaining temperature data of target devices in two or more power modules;
   analyzing whether the power modules are operating at full power when the temperature data of the target devices meets a preset temperature fault condition; and
   adjusting operating parameters of the power modules based on the temperature data when the power modules are not operating at full power.

2. The method of power distribution control for power module according to claim 1, wherein the temperature fault condition comprises that a temperature of a target device is greater than a preset temperature threshold, or a temperature change rate of a target device is greater than a preset temperature change threshold.

3. The method of power distribution control for power module according to claim 1, wherein the target devices comprise a semiconductor device or a magnetic device.

4. The method of power distribution control for power module according to claim 1, wherein after analyzing whether the power modules are operating at full power when the temperature data of the target devices meets the preset temperature fault condition, the method further comprises:
   when the power modules are operating at full power, controlling the power modules operating at full power to operate at reduced power.

5. The method of power distribution control for power module according to claim 1, wherein the adjusting the operating parameters of the power modules based on the temperature data when the power modules are not operating at full power comprises:
   when the power modules are not operating at full power and each of the power modules is at over-temperature, controlling each of the power modules to operate at reduced power; and
   when the power modules are not operating at full power and a portion of the power modules are at over-temperature, adjusting the operating parameters of the power modules based on a connection relationship among the power modules.

6. The method of power distribution control for power module according to claim 5, wherein the operating parameters of the power modules comprise current and voltage; and the adjusting the operating parameters of the power modules based on the connection relationship among the power modules comprises:
   when the power modules are in a series connected state, maintaining a current of the power modules unchanged, reducing voltages of power modules which are at over-temperature, and increasing voltages of power modules which are not at over-temperature, to maintain an output power of the power modules to external unchanged; and
   when the power modules are in a parallel connected state, maintaining the voltage of the power modules unchanged, reducing currents of power modules which are at over-temperature, and increasing currents of power modules which are not at over-temperature, to maintain an output power of the power modules to external unchanged.

7. An apparatus of power distribution control for a power module, comprising:
   a data obtaining module configured to obtain temperature data of target devices in two or more power modules;
   a data analysis module configured to analyze whether the power modules are operating at full power when the temperature data of the target devices meets a preset temperature fault condition; and
   a parameter adjustment module configured to adjust operating parameters of the power modules based on the temperature data when the power modules are not operating at full power.

8. A power module device comprising temperature acquisition devices, a control device, and two or more power modules, wherein the temperature acquisition devices are arranged on target devices of the power modules, and the control device is connected to the temperature acquisition devices and the power modules, wherein the temperature acquisition devices are configured to acquire temperature data of the target devices in the power modules and send the temperature data to the control device, and the control device is configured to perform a power distribution control according to the method of claim 1.

9. The power module device according to claim 8, wherein the temperature acquisition devices are negative temperature coefficient (NTC) resistors.

10. The power module device according to claim 8, wherein the power modules are connected in series or in parallel.

* * * * *